United States Patent [19]

Willson

[11] Patent Number: 5,071,066

[45] Date of Patent: Dec. 10, 1991

[54] PRESSURE AND TEMPERATURE RESPONSIVE VALVE

[76] Inventor: James R. Willson, 4010 McTyres Cove Ter., Midlothian, Va. 23112-4671

[21] Appl. No.: 673,564

[22] Filed: Mar. 22, 1991

[51] Int. Cl.$^5$ ............................................. G05D 27/00
[52] U.S. Cl. .................................. 236/92 C; 137/542
[58] Field of Search ...................... 236/92 C; 137/542; 251/359

[56] References Cited

U.S. PATENT DOCUMENTS

| | | | |
|---|---|---|---|
| 2,097,585 | 11/1937 | Carson | 137/542 X |
| 3,154,248 | 10/1964 | Fulton et al. | 236/92 C X |
| 4,311,272 | 1/1982 | Foller | 251/359 X |
| 4,344,564 | 8/1982 | Magnuson | 236/92 C X |
| 4,469,125 | 9/1984 | Keeney | 251/72 X |

Primary Examiner—William E. Tapolcai
Attorney, Agent, or Firm—John E. Toupal; Harold G. Jarcho

[57] ABSTRACT

A valve apparatus including a housing having a plastic body defining an inlet opening, an outlet opening, and a fluid communication path and an abutment surface therebetween; a valve seat movably disposed in the communication path and adapted to engage the abutment surface, the seat defining a surface area exposed to fluid pressure at the inlet opening and a valve opening in the communication path; a valve adapted for movement between a closed position engaging the valve seat and closing the valve opening and an open position separated from the valve seat and opening the valve opening; and a bias means exerting between the housing and the valve a given force biasing the valve into the closed position. Pressure below a predetermined level at the inlet opening exerts on the surface area a force that moves the valve seat away from the abutment surface and exerts on the valve a force less than the given force and in opposition thereto. Conversely, pressure above the predetermined level at the inlet opening exerts on the valve a force greater than the given force so as to move the valve into its open position. Because of the floating valve seat, dimensional changes in the plastic body over time will not affect operation of the valve.

18 Claims, 2 Drawing Sheets

PRESSURE AND TEMPERATURE RESPONSIVE VALVE

BACKGROUND OF THE INVENTION

This invention relates generally to a pressure and temperature (P & T) responsive valve and, more particularly, to a low cost P & T valve having a molded plastic body.

P & T valves are used extensively with water heaters to prevent a build-up of excessive temperature or pressure. If pressure in a typical water heater exceeds a certain level it will cause a seat disc of a P & T valve to lift away from a seat in the valve body against the force of a bias spring. Pressure in the water then is relieved through the seat disc to atmosphere. The force generated by the bias spring is usually adjusted by means of a sealed and threaded cap or by a press-in stamping In addition, the same seat disc can be displaced from the seat in the body by a temperature responsive wax motor element The wax motor element has a non-linear movement so that an output stem achieves most of its travel through a relatively narrow temperature range. A proper mixture of waxes and the initial position of the element insures that the element opens the valve disc at the proper temperature. Generally, the wax motor element is located in close proximity to the seat by means of a machined support. The support must have space around it and between it and the valve seat so there can be sufficient flow to relieve an over temperature or an over pressure condition in the water heater. This requirement for flow around the element support dictates the construction technique used for the valve body. Typically, valve bodies are sand cast to provide the coring that allows for adequate space and flow around the support. Such sand casting contributes significantly to the ultimate cost of the valve. A P & T valve could be made for less cost if plastic molding techniques could be used for the valve body. However, a plastic molded body would introduce problems associated with dimensional stability, and flow.

The object of this invention, therefore, is to provide an improved, lower cost P & T valve.

SUMMARY OF THE INVENTION

The invention is a valve apparatus including a housing having a plastic body defining an inlet opening, an outlet opening, and a fluid communication path and an abutment surface therebetween; a valve seat movably disposed in the communication path and adapted to engage the abutment surface, the seat defining a surface area exposed to fluid pressure at the inlet opening and a valve opening in the communication path; a valve adapted for movement between a closed position engaging the valve seat and closing the valve opening and an open position separated from the valve seat and opening the valve opening; and a bias means exerting between the housing and the valve a given force biasing the valve into the closed position. Pressure below a predetermined level at the inlet opening exerts on the surface area a force that moves the valve seat away from the abutment surface and exerts on the valve a force less than the given force and in opposition thereto. Conversely, pressure above the predetermined level at the inlet opening exerts on the valve a force greater than the given force so as to move the valve into its open position. Because of the floating valve seat, dimensional changes in the plastic body over time will not affect operation of the valve.

According to one feature, the valve apparatus includes a rigid spacer disposed between the housing and the valve seat. The rigid spacer limits maximum movement of the valve seat away from the abutment surface.

According to other features of the invention, the abutment surface comprises an annular shoulder portion surrounding the inlet opening, and the valve seat comprises a central portion defining the valve opening and an annular outer lip for engaging the annular shoulder portion. This simple structural arrangement provides the desired valve functions.

According to another feature, the valve apparatus includes an O-ring disposed between the valve seat and the housing. The O-ring provides a pressure seal at the inlet opening.

According to still other features of the invention, the valve comprises a disc element adapted to engage the seat and close the valve opening, and the bias means comprises a helical spring member engaged between the disc element and the housing. This functional arrangement facilitates desired valve operation.

According to yet another feature of the invention, the spacer is an elongated sleeve at least partially enclosing the spring member. Opposite ends of the sleeve engage the housing and the seat to limit maximum movement thereof away from the abutment surface.

According to further features of the invention, the inlet opening is oriented transversely to the outlet opening, the housing further defines an assembly opening aligned with the inlet opening, the housing comprises cap means covering the assembly opening, and the spring member is engaged between the cap means and the disc element. In this convenient structural arrangement the sleeve engages the cap means in response to the maximum movement of the seat.

In a featured embodiment of the invention, the valve seat defines a retainer disposed in the inlet opening, and the valve apparatus includes a temperature responsive actuator means retained by the retainer and adapted to engage and move the valve into its open position in response to a temperature at the inlet opening above a desired maximum value. This feature additionally provides the valve apparatus with a desirable temperature relief function.

According to further features of the invention, the O-ring is resilient; and the remainder of the seat, the spacer, and the disc element are formed from metal. The use of internal metal components insures reliable long term operation of the valve.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
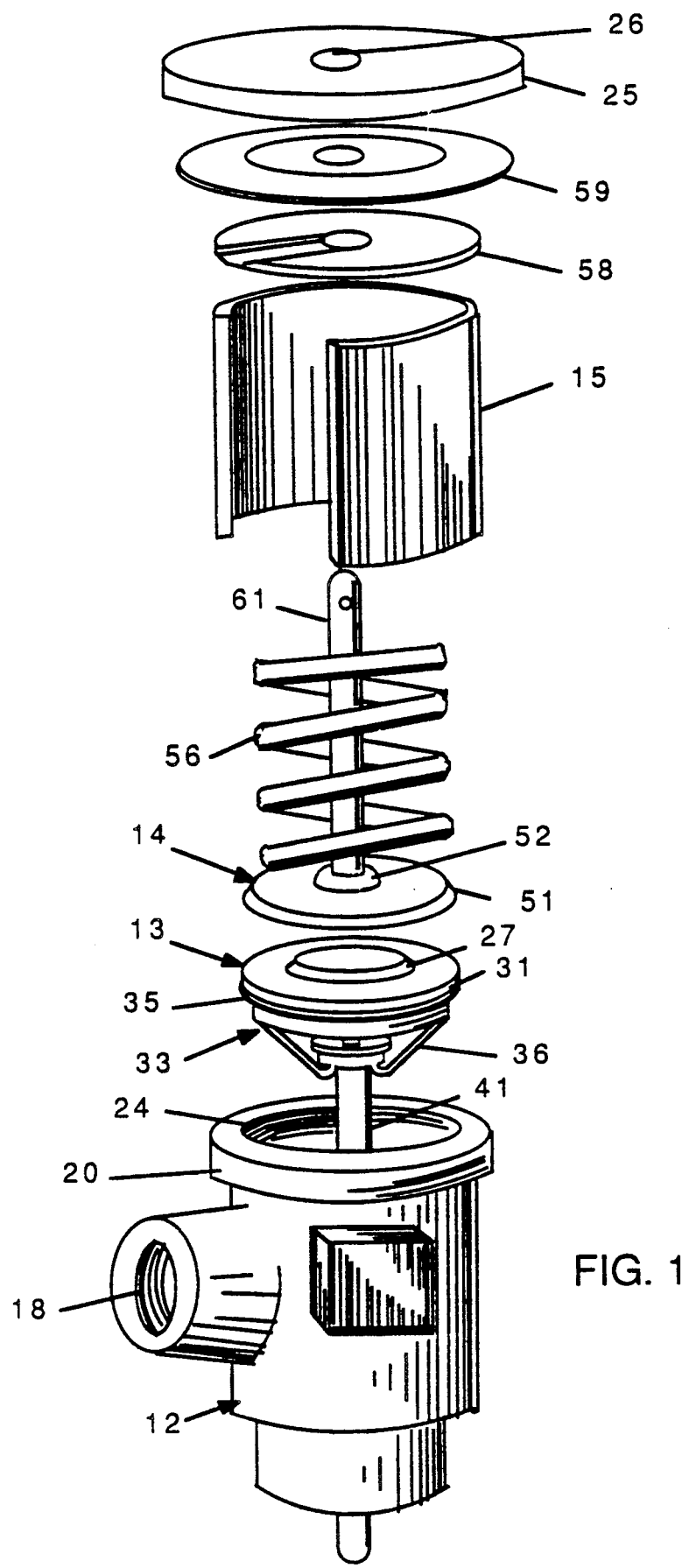
FIG. 1 is an exploded perspective view of a pressure responsive valve according to the invention.
Figure 2:
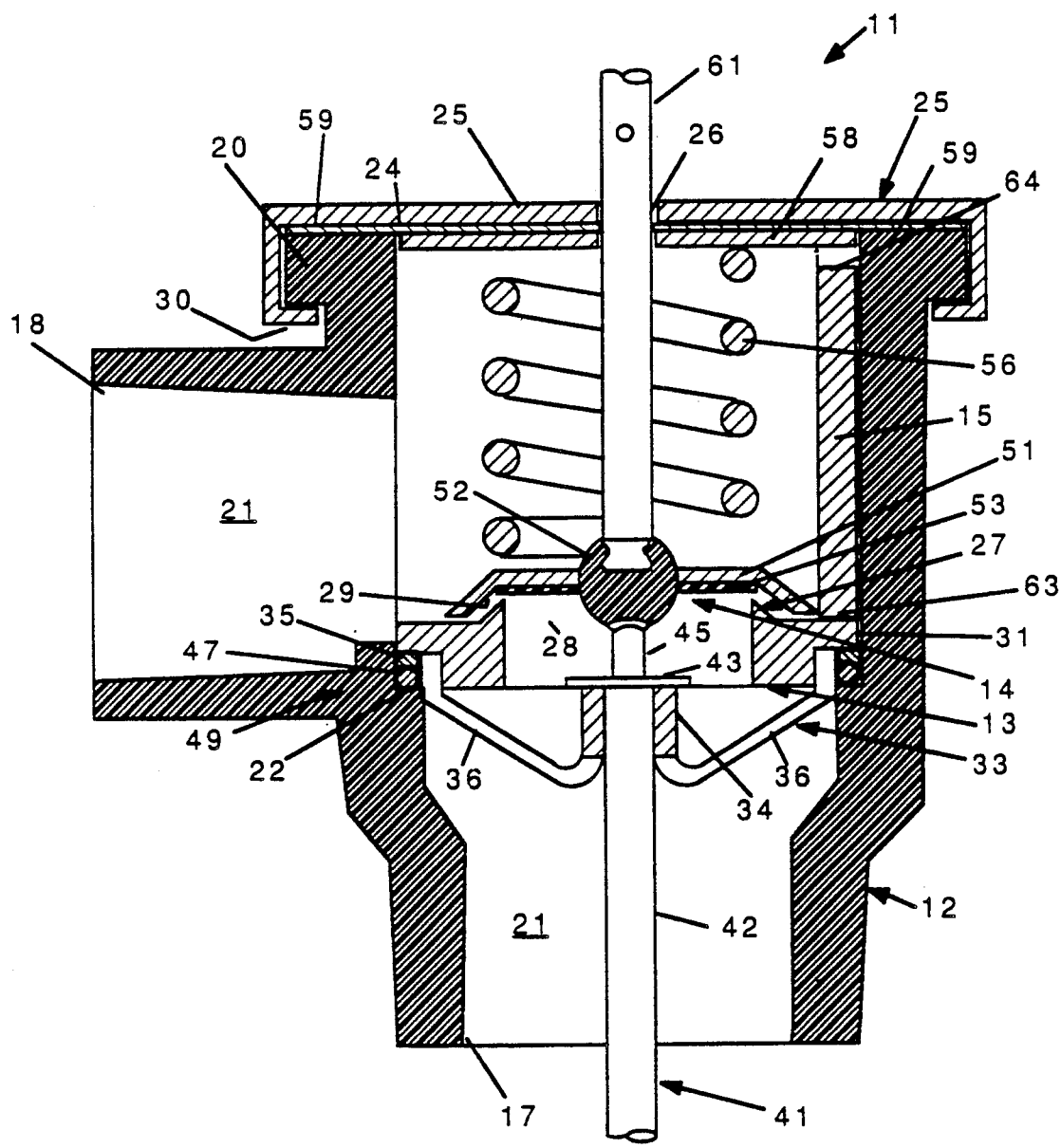
FIG. 2 is a cross sectional view of the valve shown in FIG. 1.

A pressure responsive valve 11 includes a valve housing 12; and a valve seat assembly 13, a valve assembly 14 and a spacer sleeve 15 all retained thereby. The valve housing 12 defines an inlet opening 17 and an outlet opening 18 oriented transversely with respect thereto. Also defined by the housing 12 is a fluid communication path 21 between the inlet opening 17 and the outlet opening 18 and an internal annular shoulder 22 that surrounds the inlet opening 17 and forms an abutment surface as described hereinafter. The housing 12 further defines an assembly opening 24 aligned with and spaced from the inlet opening 17. Also included in the valve housing 12 is a cap 25 having a central aperture 26 and covering the assembly opening 24. The cap 25 is fixed to the housing 12 by rolling an outer periphery 30 thereof over an outwardly projecting flange portion 20. Preferably, the housing 12 is molded from a suitable plastic while the valve seat assembly 13, the valve assembly 14 and the cap 25 are fabricated with metal.

The valve seat assembly 13 includes a valve seat 27 having a central portion 28 that defines a valve opening 29 that is disposed in the path 21 so as to provide fluid communication between the inlet opening 17 and the outlet opening 18. Extending outwardly from the central portion 28 is an annular flange portion 31. Also included in the valve seat assembly 13 is a spider assembly 33 including a central receptacle portion 34, an outer annular peripheral portion 35 and a plurality of leg portions 36 extending therebetween. The peripheral portion 35 engages the annular flange portion 31 on the valve seat 27. Forming the receptacle portion 34 is an eyelet type structure that retains a conventional, temperature responsive wax motor 41. The wax motor 41 has a cylindrical case 42 that extends through the receptacle portion 34 and includes an outwardly extending shoulder portion 43 engaged thereby. Extending out of the case 42 is an actuator piston 45. A resilient O-ring seal 47 is disposed between the abutment shoulder surface 22 and the outer peripheral portion 35 of the spider assembly 33. Together, the annular flange portion 31 of the valve seat 27, the outer peripheral portion 35 of the spider assembly 33 and the O-ring 47 form an annular lip assembly 49 that engages the abutment shoulder surface 22 of the valve housing 12.

The valve assembly 14 includes a valve disc 51 having a central opening sealed to a central body 52. Retained by the disc 51 is a resilient washer 53 adapted to seat against the center portion 28 of the valve seat assembly 13 and thereby seal the valve opening 29. Also included in the valve assembly 14 is a helical spring member 56 extending between the valve disc 51 and a calibration spacer 58. A seal washer 59 is retained between the spacer disc 58 and the cap 25 and hermetically seals the assembly opening 24. A valve adjustment rod 61 has one end engaged to the central body 52 of the valve assembly 14, a mid-portion extending through the helical spring member 56 and an outer end projecting out of the valve housing 12 through the central aperture 25 in the cap 25.

The spacer 15 comprises an elongated split sleeve that partially encloses the helical spring member 56. One end 63 of the spacer sleeve 15 engages the flange portion 31 of the valve seat assembly 13 and an opposite end 64 is spaced a predetermined distance from that portion of the valve housing 12 formed by the cap 25. The precise spacing existing between the sleeve 15 and the housing 12 is determined by selecting a calibration spacer disc 58 of desired thickness.

OPERATION

During typical use, the valve 11 is mounted on a water heater (not shown) with the inlet opening 17 communicating with the interior water reservoir section of the heater and the outlet opening 18 vented to atmosphere. With the valve 11 so positioned, the spring member 56 exerts a given force which biases the valve disc 51 into a closed position that seals the valve opening 28 in the valve seat 27. Vapor pressure within the heater tank at the inlet opening 17 applies a force against the surface area provided by the seat assembly 13. With low internal pressure, the spring 56 forces the seat 27 assembly 27 and O-ring 47 into engagement with the shoulder 22. However, at higher internal pressure, the resultant forces move the seat assembly 13, the valve assembly disc 51 and the spacer sleeve 15 upwardly until the opposite end 64 thereof engages the calibration spacer disc 58. Assuming a desired pressure relief setting of 150 psi, the spring member 56 is selected to exert a force of, for example, 30 pounds on the valve disc 51. A 150 psi pressure at the inlet 17 will exert a 130 lb. force on the seat assembly insuring a maximum movement of the spacer sleeve 15 into engagement with the housing 12. That same pressure will exert a force on the valve assembly 14 that overcomes the spring 56 to open the valve disc 51 and vent the inlet 17 to atmosphere through the valve opening 29. Thus a constant reference is provided for the metal valve components which reference is not affected by flow induced distortion of the low cost plastic housing 12.

In the event of excessive temperature at the inlet 17, the piston 45 of the wax motor 41 will move into engagement with and move the central body 52 upwardly to open the valve disc 51. Again, the inlet is vented to atmosphere through the valve opening 29 and the outlet opening 18. Although, a prior movement of the valve seat assembly producing engagement between the spacer sleeve 15 and the housing 12 will produce a slight decrease in force provided by the spring 56, the temperature responsive wax motor 41 responds to distance and not to force and will be unaffected by the change in spring force. The diameter of the receptacle portion 34 of the retainer assembly 33 is selected to provide a mass large enough to support the load experienced but small enough to accommodate sufficient flow by the leg portions 36.

Obviously, many modifications and variations of the present invention are possible in light of the above teachings. It is to be understood, therefore, that the invention can be practiced otherwise than as specifically described.

What is claimed is:

1. A valve apparatus comprising:

housing means comprising a plastic body defining an inlet opening, an outlet opening, and a fluid communication path and an abutment surface therebetween;

valve seat means movably disposed in said communication path and adapted to engage said abutment surface, said seat means defining a surface area exposed to fluid pressure at said inlet opening and a valve opening in said communication path;

a valve means adapted for movement between a closed position engaging said valve seat means and closing said valve opening and an open position separated from said valve seat means and opening said valve opening; and bias means exerting between said housing and said valve means a given force biasing said valve means into said closed position, and wherein pressure below a predetermined level at said inlet opening exerts on said surface area a force that moves said valve seat means away from said abutment surface and exerts on said valve means a force less than said given force and in opposition thereto, and pressure above said predetermined level at said inlet opening exerts on said valve means a force greater than said given force so as to move said valve means into said open position.

2. A valve according to claim 1 including rigid spacer means disposed between said housing means and said valve seat means, and adapted to limit the maximum thereof away from said abutment surface.

3. A valve according to claim 2 wherein said abutment surface comprising an annular shoulder portion surrounding said inlet opening, and said valve seat means comprises a central portion defining said valve opening and an annular outer lip means for engaging said annular shoulder portion.

4. A valve according to claim 3 including an O-ring seal engaged between said housing means and said valve seat means.

5. A valve according to claim 3 wherein said valve means comprises a disc element adapted to engage said valve seat means and close said valve opening, and said bias means comprises a helical spring member engaged between said disc element and said housing means.

6. A valve according to claim 5 wherein said spacer means comprises an elongated sleeve at least partially enclosing said spring member and having ends adapted to engage said housing means and said seat means in response to said maximum movement thereof away from said abutment surface.

7. A valve according to claim 6 wherein said inlet opening is oriented transversely to said outlet opening, said housing means further defines an assembly opening aligned with said inlet opening; said housing means comprises cap means covering said assembly opening, said spring member is engaged between said cap means and said disc element, and said sleeve is adapted to engage said cap means in response to said maximum movement of said valve seat means.

8. A valve according to claim 3 wherein said valve seat means defines a retainer means disposed in said inlet opening, and said valve apparatus includes a temperature responsive actuator means retained by said retainer means and adapted to engage and move said valve means into said open position in response to a temperature at said inlet opening above a desired maximum value.

9. A valve according to claim 8 including an O-ring seal engaged between said housing means and said valve seat means.

10. A valve according to claim 8 wherein said actuator comprises a wax motor having a case retained by said retainer means and a piston movable into engagement with said valve means.

11. A valve according to claim 10 wherein said retainer means comprises a spider assembly having a receptacle portion retaining said case, an annular outer peripheral portion comprised by said outer lip means, and a plurality of leg portions extending between said peripheral portion and said receptacle portion and defining fluid communication openings to said inlet opening.

12. A valve according to claim 11 including an O-ring seal engaged between said housing means and said valve seat means.

13. A valve according to claim 11 wherein said valve means comprises a disc element adapted to engage said valve seat means and close said valve opening, and said bias means comprises a helical spring member engaged between said disc element and said housing means.

14. A valve according to claim 13 including an O-ring seal engaged between said housing means and said valve seat means.

15. A valve according to claim 13 wherein said spacer means comprises an elongated sleeve at least partially enclosing said spring member and having ends adapted to engage said housing means and said seat means in response to said maximum movement thereof away from said abutment surface.

16. A valve according to claim 14 including an O-ring seal engaged between said housing means and said valve seat means.

17. A valve according to claim 14 wherein said O-ring is resilient; and the remainder of said seat means, said spacer means, and said disc element are formed from metal.

18. A valve according to claim 17 wherein said spacer means comprises an elongated sleeve at least partially enclosing said spring member and having ends adapted to engage said housing means and said seat means in response to said maximum movement thereof away from said abutment surface.

* * * * *